(12) United States Patent
Ibacoglu et al.

(10) Patent No.: US 12,179,914 B2
(45) Date of Patent: Dec. 31, 2024

(54) ROTARY WING AIR VEHICLE

(71) Applicant: TUSAS-TURK HAVACILIK VE UZAY SANAYII ANONIM SIRKETI, Ankara (TR)

(72) Inventors: Hasan Ibacoglu, Ankara (TR); Burhan Sahin, Ankara (TR)

(73) Assignee: TUSAS-TURK HAVACILIK VE UZAY SANAYII ANONIM SIRKETI, Ankara (TR)

(*) Notice: Subject to any disclaimer, the term of this patent is extended or adjusted under 35 U.S.C. 154(b) by 0 days.

(21) Appl. No.: 18/207,749

(22) Filed: Jun. 9, 2023

(65) Prior Publication Data

US 2024/0002046 A1    Jan. 4, 2024

(30) Foreign Application Priority Data

Jun. 29, 2022 (TR) ................................ 2022/010785

(51) Int. Cl.
    *B64C 27/72*      (2006.01)

(52) U.S. Cl.
    CPC ...... *B64C 27/72* (2013.01); *B64C 2027/7294* (2013.01)

(58) Field of Classification Search
    CPC ......... Y02T 50/30; Y02T 50/10; B64C 27/12; B64C 27/322; B64C 27/615; B64C 27/605; B64C 2027/7266; B64C 27/54; B64C 27/72; B64C 27/10; B64C 33/02; B64C 11/346; B64C 13/00; B64C 2027/7216; B64C 2027/7255; B64C 2027/7294; B64C 27/001; B64C 27/04; B64C 27/06; B64C 27/37; B64C 27/41; B64C 27/625; B64C 3/50; B64C 9/18

See application file for complete search history.

(56) References Cited

U.S. PATENT DOCUMENTS

| | | | | |
|---|---|---|---|---|
| 1,350,312 A | * | 8/1920 | Hubbard | B64C 11/346 416/50 |
| 1,405,643 A | * | 2/1922 | Weaver | B64C 11/346 416/50 |
| 2,483,480 A | * | 10/1949 | Stalker | B64C 27/54 416/123 |

(Continued)

FOREIGN PATENT DOCUMENTS

| | | | |
|---|---|---|---|
| CN | 111470039 A | | 7/2020 |
| GB | 902862 A | * | 7/1960 |

*Primary Examiner* — Eric J Zamora Alvarez
(74) *Attorney, Agent, or Firm* — Notaro, Michalos & Zaccaria P.C.

(57) ABSTRACT

A rotary wing air vehicle has a body; at least one engine located on the body; a rotor that extends outwards from the body and rotates around its own axis in connection with the engine; at least one shaft extending outward from the rotor and triggered by the engine to rotate around an axis that the shaft extends from the rotor; at least two blades connected with the shaft and triggered by the shaft to move; at least one flap on the blade which provides drag force to the rotor by its movement to a closed position or an open position; at least one brake system which is located on the body in connection with the rotor to enable the flap to move to the closed position and/or open position so that a rotational speed of the rotor is adjusted by a user.

10 Claims, 4 Drawing Sheets

(56) References Cited

U.S. PATENT DOCUMENTS

| | | | | | |
|---|---|---|---|---|---|
| 2,532,469 | A | * | 12/1950 | Trautman | B64D 31/02 |
| | | | | | 244/76 R |
| 2,568,214 | A | * | 9/1951 | Bennett | B64C 27/51 |
| | | | | | 416/140 |
| 2,680,579 | A | * | 6/1954 | Hohenemser | B64C 27/12 |
| | | | | | 244/17.13 |
| 2,704,128 | A | * | 3/1955 | Papadakos | B64C 27/12 |
| | | | | | 416/163 |
| 2,941,753 | A | * | 6/1960 | Ripper | B64D 1/16 |
| | | | | | 342/407 |
| 3,246,862 | A | | 4/1966 | Celniker et al. | |
| 5,820,341 | A | * | 10/1998 | Mondet | B64C 27/322 |
| | | | | | 416/53 |
| 7,014,142 | B2 | | 3/2006 | Barocela et al. | |
| 9,234,502 | B2 | * | 1/2016 | Friedrich | F03D 7/0228 |
| 2004/0056149 | A1 | * | 3/2004 | Pines | B64C 33/02 |
| | | | | | 244/11 |

* cited by examiner

Figure - 8

ROTARY WING AIR VEHICLE

FIELD

The present invention relates to a mechanical brake mechanism for rotor brake systems used in rotary wing air vehicles.

BACKGROUND

Unlike an airplane, a rotary-wing air vehicle uses the rotor as both a lift, thrust and control element. As a result of the rotational movement of the rotor, helicopters can hang in the air; however, they have a very high-power consumption. In airplanes, on the other hand, the lift is provided by the wing aerodynamics, while power is spent to provide the thrust to overcome the fuselage drag. The flow on the blade reaches high velocities with the rotation of the blade while the helicopter is flying in a vertical direction. In order to use the helicopter blade as an airplane wing, after the rotor is stopped, the blade, which remains at an opposite angle, must be rotated 180 degrees and brought to a required position according to the flow. This is a structurally demanding, stability risky and control complex action. Since the elliptical flaps have the same geometry on both the trailing edge and the leading edge, they can be easily brought to the required position simply by correcting the angle, without the need to rotate the blade. Similar to the normal flap, it is possible to obtain the most suitable blade geometry by optimizing the change of hump and thickness ratio along the blade.

U.S. Pat. No. 3,246,862A2, which is included in the known-state of the art, discloses that, when an adequate forward flight mode is achieved on the air vehicle, rotor speed maintained by the engines and propellers is decelerated by appropriate control of the rotor propulsion power means and the motion of the air vehicle. It is explained that the air vehicle is controlled by the pump in the brake system and the rotor speed.

CN111470039A, which is included in the known-state of the art, discloses a rotor control system suitable for a heavy-duty rotary-wing air vehicle with stepped propellers. The air vehicle adopts a stepped propeller system consisting of an upper propeller system and a lower propeller system, and an elevator-type auxiliary propeller is utilized.

U.S. Pat. No. 7,014,142B2, which is included in the known-state of the art, discloses a rotor-blade air vehicle with a friction-reducing flap. It is disclosed that an apparatus in an air vehicle can advantageously reduce friction on the rotor/blades during linear and/or rotary flight.

SUMMARY

A rotary-wing air vehicle according to the present invention has both the capabilities of a vertically landing and take-off helicopter, and enables the rotating rotor to act like a wing by stopping the rotating rotor in the air in order to stay longer and move faster in the air by gliding like an airplane.

By creating air drag with the flaps on the blade, it provides brake almost entirely by mechanical effects.

Another object of the invention is to provide a modular and flexible brake mechanism for a rotary wing air vehicle.

The rotary wing air vehicle realized to achieve the object of the present invention, which is illustrated in the first claim and other claims dependent thereon, comprises a body; at least one engine located on the body, using fuel for the movement of the body, and producing the required power for air vehicle to fly. The rotary wing air vehicle comprises at least one rotor that creates the aerodynamic lift required for the body to take off during the take-off motion of the body. The rotor operates in conjunction with the engine. The rotary wing air vehicle comprises at least one shaft driven by the engine and rotating around an axis that the shaft extends from the rotor. The rotary wing air vehicle comprises at least two blades extending out of the body and rotating around the axis it extends, connected to the rotor and the shaft, rotating together with the rotor around the axis on which the rotor extends, and thus obtaining the necessary force to lift the body. The rotary wing air vehicle comprises at least one flap on the blade, which provides drag force to the rotor by its movement. The flaps comprise a closed position (C) in which flaps are provided on the blade in correspondence with the surface thereof; an open position (O) in which flaps extend outward from the surface and opened to remain opposite to the air; an open position (O) in which the flap extends out of the blade by moving linearly with the movement of the rotor from the closed position (C), and increases the rotor drag force; at least one brake system located on the body in connection with the rotor, which allows the rotor speed to be adjusted by the user by enabling the flap to switch to the closed position (C) and/or open position (O).

The rotary wing air vehicle according to the invention comprises at least one element that moves in connection with the rotational movement of the blade. The element is triggered by the shaft. The element rotates at a torque different from the rotation speed of the shaft, depending on the rotational movement of the blade. The flaps are brought to the open position (O) and/or closed position (C) by the rotational movement of the element, almost entirely mechanically. Open position (O) and/or closed position (C) of the flaps is proportional to the rotational movement of the rotor. The rotary wing air vehicle comprises at least one flap mechanism for positioning the element, which is located in connection with the shaft. The rotary wing air vehicle comprises the flap mechanism that is triggered by the brake system with the torque received from the rotor, thus moving at a speed predetermined by the user into the open position (O) and/or closed position (C), so that the flap mechanism creates a force with respect to the forward movement of the air vehicle and the rotational direction, thus decreasing its speed and creating a brake by measuring the revolutions.

In an embodiment of the invention, the rotary wing air vehicle comprises at least one pin that transfers the torque received from the brake system to the shaft. The pin is located in the flap mechanism in connection with the brake system. The rotary-wing air vehicle comprises at least one table with one end connected to the shaft and the other end to the pin. The table is located between the shaft and the pin for torque transfer. The table and the element are provided in connection with each other in the flap mechanism. In order for the table to rotate, it comprises free rotation of the element such that it moves closer to and away from the pin. The element triggered by the shaft comprises gradually reducing the rotor speed as the flaps come to the open position (O) and/or closed position (C).

In an embodiment of the invention, the rotary wing air vehicle comprises at least one rod that transfers the movement from the table to the flaps. The rod is located in the shaft at least partially in contact with the table. The table is located in the flap mechanism, inclined with respect to the pin. It is positioned in an inclined form so that one side of the table is up and one side is down. The table transfers the free rotational movement from the element to the flaps via the shaft.

In an embodiment of the invention, the rotary wing air vehicle comprises a spindle rod for removable assembly of flaps on the blades. The spindle rods are removable on the blades. The rotary wing air vehicle comprises at least one vertical transfer part, which is connected to the shaft at one end and to the spindle rod at the other end, thus transferring the torque force received from the shaft to the spindle rods.

In an embodiment of the invention, the rotary wing air vehicle comprises at least one support arm for each flap to hold the flaps in the open position (O). The support arm is located on the blade in connection with the spindle rod, and is used for incoming torque transfer. It comprises at least one spring for each flap, which is located on the blade in connection with the flap and stores compression energy in order for the support arm to move from the closed position (C) to the open position (O).

In an embodiment of the invention, the rotary wing air vehicle comprises the pin extending from the table to the brake system. It comprises at least one pin spring surrounding the pin in connection with the pin, and storing compression energy thereon. It comprises at least one bearing on the pin, which rotates around its own axis to generate torque. It comprises at least one plate moving towards and away from the table on an axis to which it is attached. The plate is positioned on the pin, surrounding the pin. It comprises at least one wire between the bearing and the plate, with one end connected to the bearing and one end to the plate. The rotary wing air vehicle comprises the element located on the wire at an area predetermined by the user, and subjected to centrifugal force as a result of the force created by the weight of the plate, so as to enable the table to move vertically relative to the rotor, in order for the table to rotate.

In an embodiment of the invention, the rotary wing air vehicle comprises at least one transfer element, with one end connected to the plate and one end to the brake system, which transfers the force movement from the brake system with the help of a pulley thereon. The brake system is activated by moving the table vertically towards the shaft. The element is positioned on the wire by centrifugal force. By positioning the element on the wire, the table reaches the first position (I). The brake system is activated by decreasing the blade rotation speed of the flaps in the closed position (C) by means of the plate, by reducing the centrifugal force of the shaft and by decreasing the rotational speed of the plate by moving downwards, so that the speed of the rotor is decreased.

In an embodiment of the invention, the rotary wing air vehicle comprises the flap mechanism creating a brake for the rotor by the following steps:
  Switching to airplane mode while in the air,
  Interrupting the force transmission to the main rotor when the transmission clutch is released,
  Pushing the table in the transmission upwards,
  Opening the flap by equalizing the right and left rods in contact with the table,
  Brake the rotor by turning the blades on and off,
  Actuating the mechanical brake mechanism when the speed drops below a value determined by the user,
  When the speed drops below a second value determined by the user, fixing the blade and flaps to provide brake.

In an embodiment of the invention, the rotary wing air vehicle comprises the shaft that transfers the motion, which is transmitted on and from the table, to the flaps. It comprises at least one table bearing that allows the rods on the shaft to slide on the table.

In an embodiment of the invention, the rotary wing air vehicle comprises the blade with an elliptical cross-section. It comprises the flaps having a surface almost completely corresponding to the blade in the closed position (C).

In an embodiment of the invention, the rotary wing air vehicle comprises circular table and circular plate.

In an embodiment of the invention, the rotary wing air vehicle comprises the element with a spherical form.

BRIEF DESCRIPTION OF THE DRAWINGS

The rotary wing air vehicle realized to achieve the object of the present invention is illustrated in the attached drawings, in which.

All the parts illustrated in figures are individually assigned a reference numeral and the corresponding terms of these numbers are listed below:
  1. Rotary wing air vehicle
  2. Body
  3. Rotor
  4. Shaft
    401. Rod
  5. Blade
    501. Flap
  6. Brake system
  7. Element
  8. Flap mechanism
  9. Pin
  10. Table
    101. Table bearing
  11. Spindle rod
  12. Vertical transfer part
  13. Support arm
  14. Spring
  15. Pin spring
  16. Bearing
  17. Plate
  18. Wire
  19. Transfer element
  (M) Engine
  (O) Open position
  (C) Closed position
  (I) First position

DETAILED DESCRIPTION

The rotary wing air vehicle (1) comprises a body (2); at least one engine (M) located on the body (2), which generates the necessary power for air vehicle to make a flight; a rotor (3) that extends outwards from the body (2) and rotates around its own axis in connection with the engine (M); at least one shaft (4) extending outward from the rotor (3) and triggered by the engine (M) to rotate around an axis that the shaft (4) extends from the rotor (3); at least two blades (5) connected with the shaft (4) and triggered by the shaft (4) to move; at least one flap (501) on the blade (5), which provides drag force to the rotor (3) by its movement; a closed position (C) in which the flap (501) almost completely corresponds to the aerodynamic surface of the blade (5); an open position (O) in which the flap (501) moves linearly from the closed position (C) with the movement of the rotor (3), extends out of the blade (5) and increases the drag force of the rotor (3); at least one brake system (6) which is located on the body (2) in connection with the rotor (3), and which enables the flap (501) to move to the closed position (C) and/or open position (O) so that a rotational speed of the rotor (3) is adjusted by a user.

Figure 1:
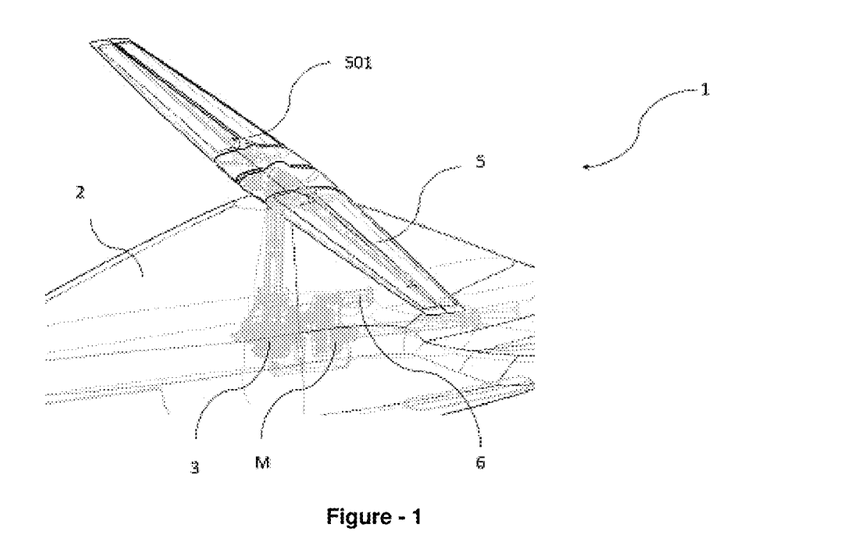
FIG. 1 is a schematic view of the rotary wing air vehicle.
Figure 7:
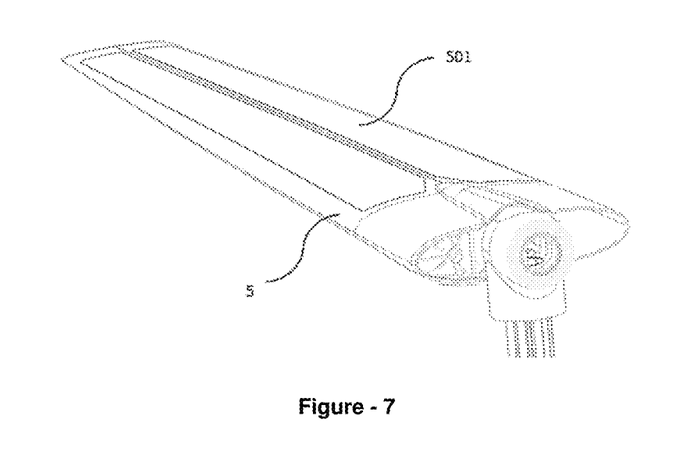
FIG. 7 is a schematic view of the flap in the closed position (C).
Figure 8:
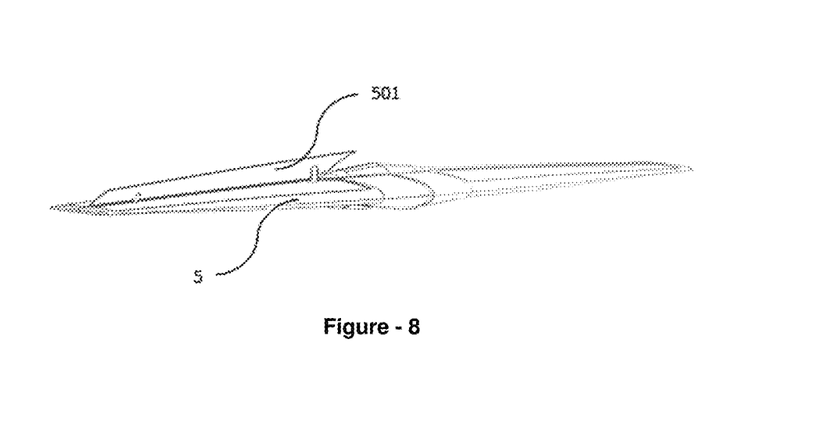
FIG. 8 is a schematic view of the flap in the open position (O).

The rotary wing air vehicle (1) according to the invention comprises at least one element (7) which is triggered by the shaft (4) to move in correspondence with the rotational movement of the blade (5), at a speed different from the rotational speed of the shaft (4); at least one flap mechanism (8) in which the element (7) is located in connection with the shaft (4), and which enables the flaps (501) to move to the open position (O) and/or closed position (C) almost entirely by mechanical effects, with respect to the rotational movement of the element (7) and movement of the rotor (3) (FIG. 1, FIG. 7, FIG. 8).

A body (2) in an air vehicle enables the engine (M) to produce the required force for air vehicle to make a flight. It comprises at least one rotor (3), which extends outward from the body (2) and rotates around its axis by transferring power; at least one shaft (4) extending outward from the rotor (3) and triggered by the motor (M) to rotate around the axis it extends from the rotor (3). With the power transmitted by the rotor (3), at least two blades (5) rotating around the rotor (3) axis can provide aerodynamic forces, thus enabling the body (2) to be carried and flown. The drag force is provided to the rotor (3) thanks to the moving flaps (501) located on the blade (5). The brake system (6) provides a closed position (C) in which the flap (501) almost completely corresponds to the aerodynamic surface of the blade (5), an open position (O) in which the flap (501) moves linearly from the closed position (C) with the movement of the rotor (3), extends out of the blade (5) and increases the drag force of the rotor (3), and a user-adjusted rotational speed of the rotor (3) by enabling the flap (501) to switch to closed position (C) and/or open position (O). Flaps (501) on the blade (5) provides braking by creating air drag in the open position (O);

Thanks to the rotational movement of the element (7), which is triggered by the shaft (4) to move according to the rotational movement of the blade (5) at a different rotational speed than the shaft (4), the flaps (501) move to the open position (O) and/or closed position (C) depending on the rotational movement of the rotor (3), almost entirely by mechanical effects. It comprises at least one flap mechanism (8) in which the element (7) is located in connection with the shaft (4). Thanks to the flap mechanism (8), in a forward-directed air vehicle, in order to stop the running blade (5), on the advanced side of the blade (5), gradual brake formation is provided for the rotor (3) by creating drag in the air flow resulting from the opening of the flaps (501) and their movement in the forward direction. During the rotation of the blade (5), when the blade (5) comes to the receding side, the blades (501) are closed to prevent the acceleration of the blade (5) by the flow in the opposite direction. As the blades (501) rotate around the rotor (3), they periodically come to the open position (O) and closed position (C), thereby providing braking for the rotor (3). The flaps (501) can be provided as single or double systems (FIG. 1).

Figure 4:
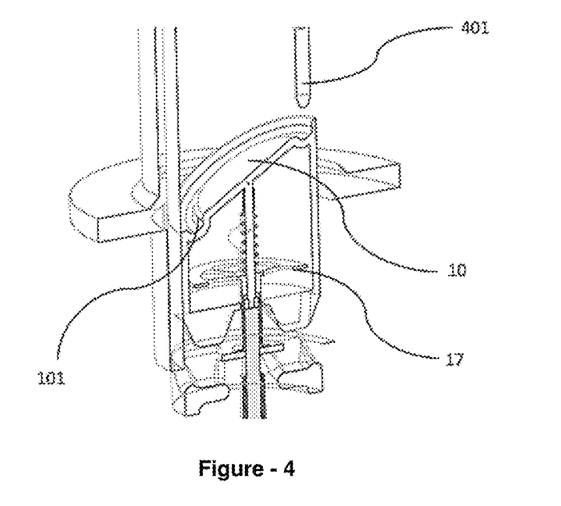
FIG. 4 is a schematic view of the transmission.

In an embodiment of the invention, the rotary wing air vehicle (1) comprises at least one pin (9) located in the flap mechanism (8) in connection with the brake system (6), and transmitting the torque received from the brake system (6) to the shaft (4); a table (10) which is located between the shaft (4) and the pin (9) for torque transfer, with one end connected to the shaft (4) and one end to the pin (9); the element (7) in connection with the table (10), which moves with free rotation to approach and move away from the pin (9) in order for the table (10) to rotate, and which is triggered by the shaft (4) to gradually reduce rotational speed of the rotor (3) by causing the flaps (501) to come to the open position (O) and/or closed position (C). When the table (10) rotates, the element (7) is subjected to centrifugal force and moves upwards due to the weight thereof (FIG. 4).

In an embodiment of the invention, the rotary wing air vehicle (1) comprises at least one rod (401) in the shaft (4), which transfers the movement from the table (10) to the flaps (501); the table (10) which is inclined relative to the pin (9) in connection with the pin (9), moves such that one side thereof is up and one side thereof is down, thus transferring the free rotation from the element (7) to the flaps (501) by means of rods (401). Thanks to the inclined table (10), the rotational movement created by the centrifuge from the element (7) is transferred to the flaps (501) via the rods (401).

Figure 3:
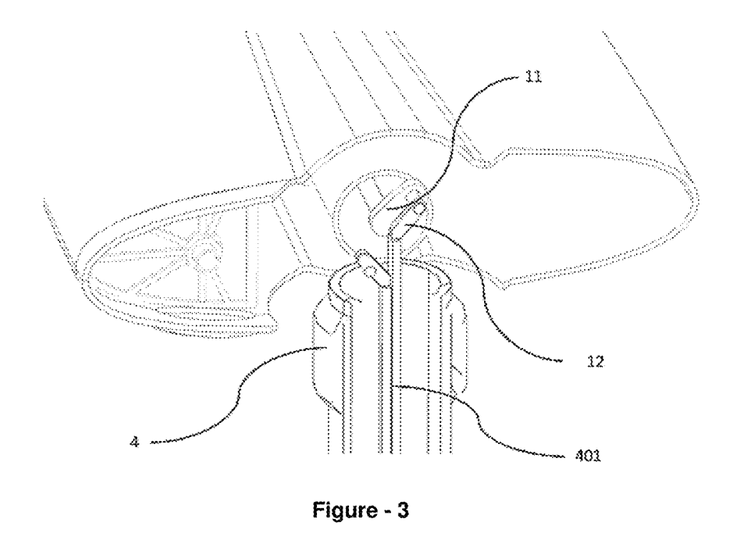
FIG. 3 is a schematic view of blade.

In an embodiment of the invention, the rotary wing air vehicle (1) comprises at least one spindle rod (11) on the blades (5), which allows the flaps (501) to be mounted removably on the blades (5); at least one vertical transfer part (12) in contact with the shaft (4) and the spindle rod (11), which provides the transfer of torque force received from the shaft (4) to the spindle rods (11). Thanks to the spindle rods (11), the blades (501) can be attached to and removed from the blade (5). Thanks to the vertical transfer part (12), torque from the shaft (4) is transferred to the shafts (11), thus moving the flaps (501) move (FIG. 3).

Figure 2:
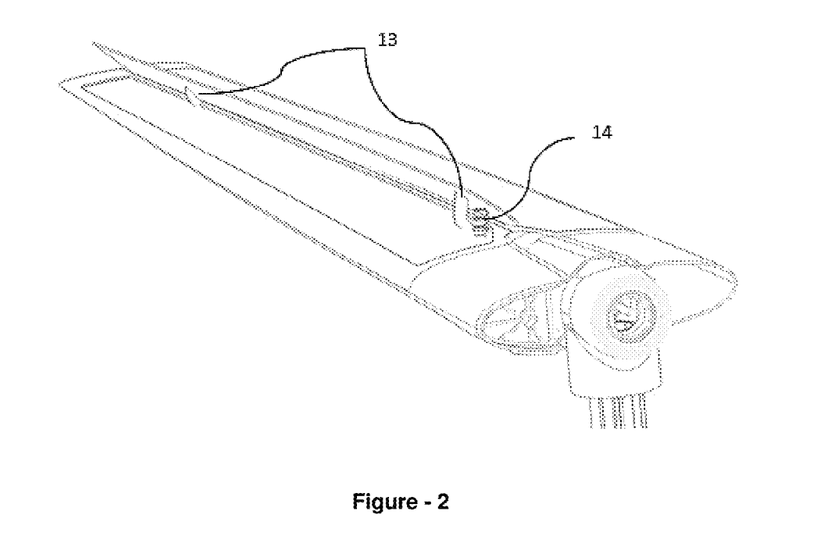
FIG. 2 is a schematic view of blade.

In an embodiment of the invention, the rotary wing air vehicle (1) comprises at least one support arm (13) located on the blade (5) in connection with the shaft (11) and keeping the flap (501) in the open position (O) by transferring the torque from the shaft (4); at least one spring (14) on the blade (5), which enables the flap (501) to come to the open position (O) with compression energy. Thanks to the support arm (13), the flaps (501) can be fixed in the open position (O). Thanks to the spring (14), the flaps (501) are opened by releasing the energy stored by compression (FIG. 2).

Figure 5:
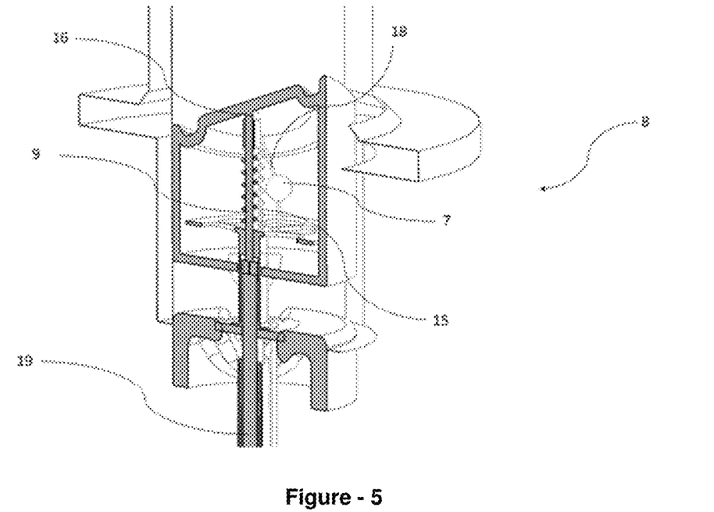
FIG. 5 is a schematic view of the flap mechanism (8).

In an embodiment of the invention, the rotary wing air vehicle (1) comprises the pin (9) extending from the table (10) towards the brake system (6); at least one pin spring (15) on the pin (9), which stores energy thereon; at least one bearing (16) on the pin (9); at least one plate (17) which can move towards or away from the table (10) on the pin (9); at least one wire (18) between the bearing (16) and the plate (17), with one end connected to the bearing (16) and one end to the plate (17); the element (7) located on the wire (18) in an area predetermined by the user, and subjected to the centrifugal force due to the force created by the weight of the plate (17), thereby enabling the vertical movement of the table (10) relative to the rotor (3) in order for the table (10) to make a rotational movement. The pin (9) is provided in the flap mechanism (8), while pin spring (15) and bearing (16) are provided on the pin (9). The element (7) is also connected to the plate (17) which can move vertically on the pin (9). Due to the rotation of the table (10) and the movement of the element (7), it is subjected to centrifugal force and moves upwards. With this movement, the plate (17) is kept at the upper side. It has no activity while flying in helicopter mode (FIG. 5).

Figure 6:
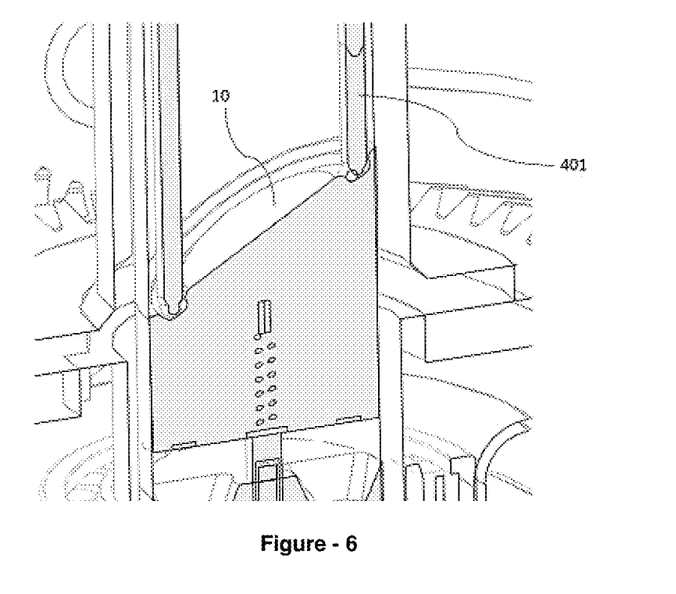
FIG. 6 is a schematic view of the table in the first position (I).

In an embodiment of the invention, the rotary wing air vehicle (1) comprises at least one transfer element (19) with one end connected to the plate (17) and one end to the brake system (6), which transfers the movement by means of the pulley thereon; the brake system (6) activated by lifting the table (10) vertically upwards; the element (7) positioned on the wire (18) by centrifugal force; the brake system (6) which enables centrifugal force of the shaft (4) to be decreased when the blade (5) rotational speed of the flaps (501) positioned in the closed position (C) through the plate (17) is decreased by the table (10) that has reached the first position (I) upon placement of the element (7) on the wire (18), wherein the brake system (6) is activated when the plate (17) is moved downwards to reduce the rotational speed thereof, thereby reducing the speed of the rotor (3). As a result of the centrifugal force of the element (7) while in the helicopter mode, the plate (17) standing above is connected to the bearing (16). Since the bearings (16) reduce the effect of the rotational movement, better control is provided. When the flaps (501) are in the open position (O), the blade (5) will slow down, rotational speed of the shaft (4) will decrease and centrifugal force of the element (7) will weaken, so that the plate (17) goes down. With the downward movement of the plate (17), the wire (18) and brake system (6) are activated for braking. The movement of the plate (17) up and down is provided by the hydraulic system (FIG. 6).

In an embodiment of the invention, the rotary wing air vehicle (1) comprises the flap mechanism (8) creating a brake for the rotor (3) by the following steps:
  Interrupting the force transmission to the rotor (3) when the transmission clutch is released,
  Moving the table (10) to the first position (I),
  Moving the flap (501) to the open position (O),
  Moving the flaps (501) continuously between the open position (O) and closed position (C) with the rotational movement,
  Actuating the brake mechanism (6) when the speed reaches a number predetermined by the user,
  Fixing the blade (5) when the speed drops below the number predetermined by the user. By fixing the position and/or forms of the blade (5) and/or flaps (501) and completely resetting the rotation, the rotary wing air vehicle (1) is switched to airplane mode.

In an embodiment of the invention, the rotary wing air vehicle (1) comprises the shaft (4) which provides the transfer of the movement transmitted on and from the table (10) to the flaps (501); at least one table bearing (101) that allows the shaft (4) to slide on the table (10). Thanks to the table bearing (101), the movement transfer to the flaps (501) is easily provided by the sliding movement of the rods (401) on the shaft (4).

In an embodiment of the invention, the rotary wing air vehicle (1) comprises flaps (501) with an elliptical cross-section almost completely corresponding to the surface of the blade (5). Since the elliptical flaps (501) have the same geometry as the blade (5) on both the trailing edge and the leading edge, the flaps (501) can be easily brought to the required position only by angle correction, without the need for rotating the blades (5).

In an embodiment of the invention, the rotary wing air vehicle (1) comprises circular table (10) and circular plate (17). Therefore, the table (10) and plate (17) are rendered form-compatible with the shaft (4).

In an embodiment of the invention, the rotary wing air vehicle (1) comprises the element (7) with a spherical form. Thanks to the spherical form of the element (7), a more effective centrifuge force can be obtained.

What is claimed is:
1. A rotary wing air vehicle (1) comprising:
  a body (2);
  at least one engine (M) located on the body (2) for generating power for the air vehicle to make a flight;
  a rotor (3) that extends outwards from the body (2) and rotates about an axis in connection with the at least one engine (M);
  at least one shaft (4) extending outward from the rotor (3) and triggered by the at least one engine (M) to rotate about the axis at a rotational speed;
  at least two blades (5) connected with the at least one shaft (4) and triggered by the shaft (4) to move;
  at least one flap (501) on at least one of the at least two blades (5), which provides drag force to the rotor (3) by movement of the at least one flap, the at least one flap (501) having a closed position (C) in which the at least one flap (501) corresponds to an aerodynamic surface of the blade (5) and an open position (O) in which the at least one flap (501) moves linearly from the closed position (C) with movement of the rotor (3), extends out of the blade (5) and increases the drag force of the rotor (3);
  at least one brake which is located on the body (2) in connection with the rotor (3), and which enables the at least one flap (501) to move to the closed position (C) and/or the open position (O) so that a rotational speed of the rotor (3) is adjusted by a user;
  at least one element (7) which is triggered by the shaft (4) to move in correspondence with rotational movement of the blade (5) at a speed that is different from the rotational speed of the shaft (4);
  at least one flap mechanism (8) in which the at least one element (7) is located in connection with the shaft (4), and which enables the at least one flap (501) to move to the open position (O) and/or closed position (C), with respect to rotational movement of the at least one element (7) and movement of the rotor (3);
  at least one pin (9) located in the flap mechanism (8) in connection with the at least one brake, the at least one pin transmitting torque received from the brake to the shaft (4); and
  a table (10) located between the shaft (4) and the pin (9) for torque transfer, with one end connected to the shaft (4) and a second end to the pin (9), the at least one element (7) in connection with the table (10), which moves with free rotation to approach and move away from the pin (9) in order for the table (10) to rotate, and which is triggered by the shaft (4) to gradually reduce the rotational speed of the rotor (3) by causing the at least one flap (501) to come to the open position (O) and/or closed position (C).

2. The rotary wing air vehicle (1) according to claim 1, comprising at least one rod (401) in the shaft (4), which transfers movement from the table (10) to the at least one flap (501); wherein the table (10), which is inclined relative to the pin (9) in connection with the pin (9), moves such that one side thereof is up and one side thereof is down, thus transferring the free rotation from the at least one element (7) to the at least one flap (501) by the at least one rod (401).

3. The rotary wing air vehicle (1) according to claim 1, comprising:
- at least one spindle rod (11) on the blades (5) which allows the at least one flap (501) to be mounted removably on the blades (5); and
- at least one vertical transfer part (12) that is in contact with the shaft (4) and the at least one spindle rod (11) and which provides a transfer of torque force received from the shaft (4) to the at least one spindle rod (11).

4. The rotary wing air vehicle (1) according to claim 3, comprising:
- at least one support arm (13) located on the blade (5) in connection with the shaft (11) and keeping the at least one flap (501) in the open position (O) by transferring torque from the shaft (4); and
- at least one spring (14) on the blade (5), which enables the at least one flap (501) to come to the open position (O) with compression energy.

5. The rotary wing air vehicle (1) according to claim 1, wherein the at least one pin (9) extends from the table (10) towards the brake; and comprising:
- at least one pin spring (15) on the pin (9), which stores energy thereon;
- at least one bearing (16) on the pin (9);
- at least one plate (17) which can move towards or away from the table (10) on the pin (9);
- at least one wire (18) between the bearing (16) and the plate (17), with one end connected to the bearing (16) and one end to the plate (17); and
- wherein the at least one element (7) is located on the wire (18) in an area predetermined by the user, and subjected to a centrifugal force due to a force created by a weight of the plate (17), thereby enabling vertical movement of the table (10) relative to the rotor (3) in order for the table (10) to make a rotational movement.

6. A method for operating the rotary wing air vehicle (1) according to claim 1, wherein the flap mechanism (8) brakes the rotor (3) by the following steps:
- interrupting a force transmission to the rotor (3),
- moving the table (10) to the first position (i),
- moving the at least one flap (501) to the open position (o),
- moving the at least one flap (501) continuously between the open position (o) and closed position (c) with rotational movement,
- actuating the brake when the speed reaches a number predetermined by the user, and
- fixing the blade (5) when the speed drops below the number predetermined by the user.

7. The rotary wing air vehicle (1) according to claim 1, wherein the shaft (4) transfers movement from the table (10) to the at least one flap (501), and further comprising at least one table bearing (101) that allows the shaft (4) to slide on the table (10).

8. The rotary wing air vehicle (1) according to claim 1, wherein at least one flap (501) comprises an elliptical cross-section corresponding to the aerodynamic surface of the blade (5).

9. The rotary wing air vehicle (1) according to claim 5, wherein the table (10) is circular and the plate (17) is circular.

10. The rotary wing air vehicle (1) according to claim 1, wherein the at least one element (7) has a spherical form.

* * * * *